(12) United States Patent
Lian

(10) Patent No.: US 11,989,420 B2
(45) Date of Patent: May 21, 2024

(54) MEMORY ALLOCATION METHOD AND APPARATUS, ELECTRONIC DEVICE, AND STORAGE MEDIUM

(71) Applicant: CHANGXIN MEMORY TECHNOLOGIES, INC., Hefei (CN)

(72) Inventor: Junwei Lian, Hefei (CN)

(73) Assignee: Changxin Memory Technologies, Inc., Hefei (CN)

( * ) Notice: Subject to any disclaimer, the term of this patent is extended or adjusted under 35 U.S.C. 154(b) by 92 days.

(21) Appl. No.: 17/810,005

(22) Filed: Jun. 30, 2022

(65) Prior Publication Data

US 2023/0266883 A1 Aug. 24, 2023

(30) Foreign Application Priority Data

Feb. 24, 2022 (CN) .......................... 202210172933.3

(51) Int. Cl.
*G06F 9/50* (2006.01)
*G06F 3/06* (2006.01)

(52) U.S. Cl.
CPC .......... *G06F 3/0617* (2013.01); *G06F 3/0631* (2013.01); *G06F 3/0653* (2013.01); *G06F 3/0659* (2013.01); *G06F 3/0673* (2013.01); *G06F 9/5016* (2013.01); *G06F 9/5027* (2013.01)

(58) Field of Classification Search
CPC .... G06F 3/0617; G06F 3/0631; G06F 3/0653; G06F 3/0659; G06F 3/073
See application file for complete search history.

(56) References Cited

U.S. PATENT DOCUMENTS 5,673,388 A * 9/1997 Murthi ................... G11C 29/26
714/47.1
2017/0168849 A1* 6/2017 He ........................ G06F 9/4401

FOREIGN PATENT DOCUMENTS

CN 101256520 A 9/2008
CN 112269656 A 1/2021

* cited by examiner

*Primary Examiner* — Michael Krofcheck
*Assistant Examiner* — Janice M. Girouard
(74) *Attorney, Agent, or Firm* — Cooper Legal Group, LLC

(57) ABSTRACT

The present disclosure relates to the technical field of system-level memory test, and in particular, to a memory allocation method and apparatus, an electronic device, and a computer-readable storage medium. The method includes: obtaining a plurality of memory segments corresponding to a to-be-processed task, and determining a plurality of operation cores in an operation platform that executes the to-be-processed task; determining a first-capacity memory segment and a second-capacity memory segment in the plurality of memory segments according to the plurality of operation cores, wherein a memory capacity of the second-capacity memory segment is larger than a memory capacity of the first-capacity memory segment; allocating each first-capacity memory segment one by one to the operation cores, and determining remaining memory capacities corresponding to the operation cores respectively; and allocating the second-capacity memory segment to the operation cores according to the remaining memory capacities, to obtain a memory allocation result.

12 Claims, 5 Drawing Sheets

MEMORY ALLOCATION METHOD AND APPARATUS, ELECTRONIC DEVICE, AND STORAGE MEDIUM

CROSS-REFERENCE TO RELATED APPLICATION

This application claims the priority of Chinese Patent Application No. 202210172933.3, submitted to the Chinese Intellectual Property Office on Feb. 24, 2022, the disclosure of which is incorporated herein in its entirety by reference.

TECHNICAL FIELD

The present disclosure relates to the technical field of system-level memory test, and in particular, to a memory allocation method, a memory allocation apparatus, an electronic device, and a computer-readable storage medium.

BACKGROUND

A double data rate synchronous dynamic random access memory (DDR) is one type of memory, and a synchronous dynamic random access memory (SDRAM) is a dynamic random access memory that has a synchronous interface. Originally used in notebooks, computers and mobile devices, the DDR memory is now beginning to move into high-end server, automotive and cloud computing applications.

DDR testing can include chip-level testing, memory bank testing, and system-level testing. The DDR system-level testing is typically performed in a specific environment, such as a Unified Extensible Firmware Interface (UEFI) environment.

It should be noted that the information disclosed above is merely intended to facilitate a better understanding of the background of the present disclosure, and therefore may include information that does not constitute the prior art known to those of ordinary skill in the art.

SUMMARY

An objective of the present disclosure is to provide a memory allocation method, a memory allocation apparatus, an electronic device, and a computer-readable storage medium.

Other features and advantages of the present disclosure will become more apparent based on the following detailed description, or partially obtained through practice of the present disclosure.

According to a first aspect of the present disclosure, a memory allocation method is provided, including: obtaining a plurality of memory segments corresponding to a to-be-processed task, and determining a plurality of operation cores in an operation platform that executes the to-be-processed task; determining a first-capacity memory segment and a second-capacity memory segment in the plurality of memory segments according to the plurality of operation cores, wherein a memory capacity of the second-capacity memory segment is larger than a memory capacity of the first-capacity memory segment; allocating each first-capacity memory segment one by one to the operation cores, and determining remaining memory capacities corresponding to the operation cores respectively; and allocating the second-capacity memory segment to the operation cores according to the remaining memory capacities, to obtain a memory allocation result.

According to a second aspect of the present disclosure, a memory allocation apparatus is provided, including: a processor; and a storage apparatus, configured to store a computer program, wherein the computer program, when executed by the processor, causes the processor to execute operations of: obtaining a plurality of memory segments corresponding to a to-be-processed task, and determine a plurality of operation cores in an operation platform that executes the to-be-processed task; determining a first-capacity memory segment and a second-capacity memory segment in the plurality of memory segments according to the plurality of operation cores, wherein a memory capacity of the second-capacity memory segment is larger than a memory capacity of the first-capacity memory segment; allocating each first-capacity memory segment one by one to the operation cores, and determining remaining memory capacities corresponding to the operation cores respectively; and allocating the second-capacity memory segment to the operation cores according to the remaining memory capacities, to obtain a memory allocation result.

According to a third aspect of the present disclosure, a computer-readable storage medium is provided, wherein the computer-readable storage medium stores a computer program, and the computer program is executed by a processor to implement the above memory allocation method.

It should be understood that the above general description and the following detailed description are only exemplary and explanatory, and should not be construed as a limitation to the present disclosure.

BRIEF DESCRIPTION OF THE DRAWINGS

The drawings incorporated into the specification and constituting part of the specification illustrate the embodiments of the present disclosure, and serve, together with the specification, to explain the principles of the present disclosure. Apparently, the drawings in the following description show merely some embodiments of the present disclosure, and those of ordinary skill in the art may still derive other drawings from these drawings without creative efforts. In the drawings.

DETAILED DESCRIPTION

Figure 1:
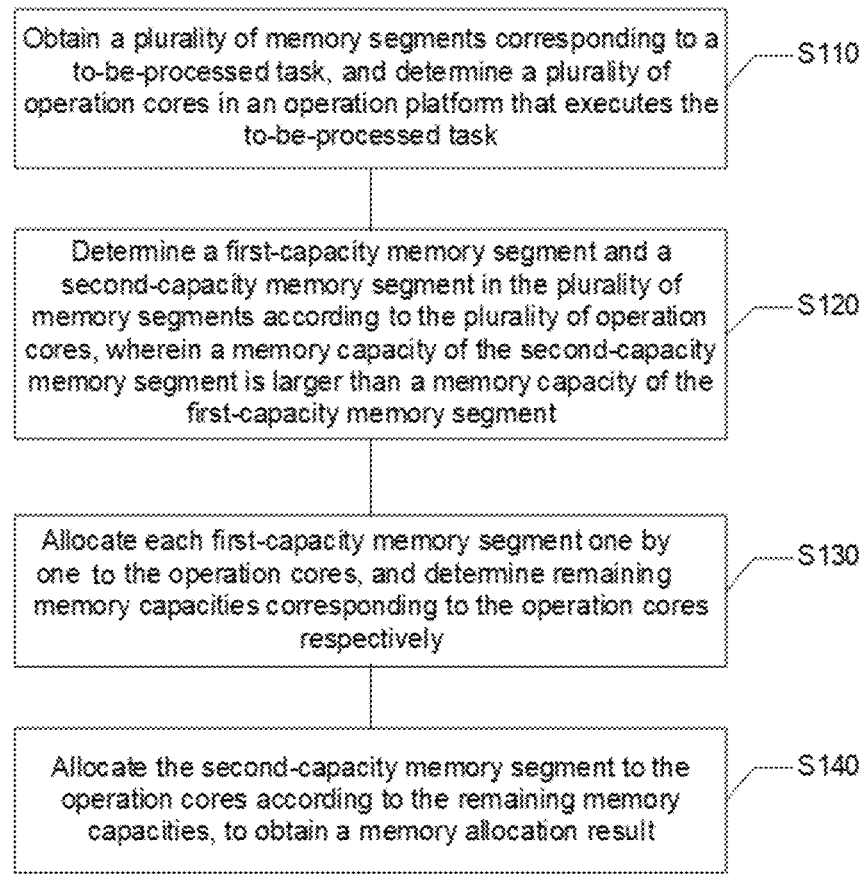
FIG. 1 is a flowchart of a memory allocation method according to an exemplary implementation of the present disclosure.

Exemplary embodiments will be described below comprehensively with reference to the drawings. The exemplary embodiments may be implemented in various forms, and may not be construed as being limited to those described herein. On the contrary, these exemplary embodiments are provided to make the present disclosure comprehensive and complete and to fully convey the concept manifested therein to those skilled in the art. The same reference numerals in the figures indicate the same or similar parts, and thus their detailed descriptions will be omitted.

The described features, structures, or characteristics may be incorporated into one or more embodiments in any suitable manner. The following description offers many specific details in order for a full understanding of the embodiments of the present disclosure. However, those skilled in the art will be aware that the technical solutions of the present disclosure may be practiced with one or more of the specific details omitted, or other methods, components, apparatuses, steps, and the like may be used. In other cases, well-known structures, methods, apparatuses, implementations, materials, or operations are not shown or described in detail to avoid obscuring aspects of the present disclosure.

The block diagrams shown in the drawings are merely functional entities, which do not necessarily correspond to physically independent entities. That is, these functional entities may be implemented in a form of software, or implemented in one or more hardware modules, or implemented in different networks and/or processor apparatuses and/or microcontroller apparatuses.

During a DDR system-level test, because the traditional computer system is a single-core machine, computer manufacturers continuously increase the clock speed of the computer, in order to improve the performance of the computer and accelerate the computing speed of the computer. Later, the clock speed of the computer cannot be further increased due to the energy wall, and the multicore technology is adopted to improve the performance and computing power of the computer.

When the DDR system-level test is performed by using a multicore system platform, the current memory segments are generally distributed in the following manner: the smallest memory segment is usually at the front and the largest memory segment is at the end. If the conventional method is used to allocate memory from front to back, multiple small memory segments are allocated to the same operation core, which makes the test speed of the operation core allocated with multiple memory segments slower than other operation cores, resulting in an increase in the total test time and a decrease in the test efficiency.

Accordingly, in this exemplary embodiment, a memory allocation method is provided first, which can be implemented by using a server or a terminal device. The terminal described in the present disclosure may include a mobile terminal such as a mobile phone, a tablet computer, a notebook computer, a palmtop computer, or a personal digital assistant (PDA), and a fixed terminal such as a desktop computer. FIG. 1 is a schematic flowchart of a memory allocation method according to an embodiment of the present disclosure. Referring to FIG. 1, the memory allocation method may include the following steps:

Step S110: Obtain a plurality of memory segments corresponding to a to-be-processed task, and determine a plurality of operation cores in an operation platform that executes the to-be-processed task.

Step S120: Determine a first-capacity memory segment and a second-capacity memory segment in the plurality of memory segments according to the plurality of operation cores, wherein a memory capacity of the second-capacity memory segment is larger than that of the first-capacity memory segment.

Step S130: Allocate each first-capacity memory segment one by one to the operation cores, and determine remaining memory capacities corresponding to the operation cores respectively.

Step S140: Allocate the second-capacity memory segment to the operation cores according to the remaining memory capacities, to obtain a memory allocation result.

In the memory allocation method according to the exemplary embodiment, the first-capacity memory segments (small memory segments) are allocated to different operation cores one by one, until all the first-capacity memory segments are allocated; the rest of the operation cores can obtain memory divided from the second-capacity memory segment (large memory segment), to complete memory allocation for the operation cores. Through the memory allocation manner a certain amount of segmental memory can be allocated to each operation core. The memory allocation scheme of the DDR system-level test, the memory allocation method of the present disclosure can reduce the test time and improve the test efficiency.

The memory allocation method in the exemplary embodiment is further described below.

In step S110, the plurality of memory segments corresponding to the to-be-processed task are obtained, and the plurality of operation cores in the operation platform that executes the to-be-processed task are determined.

In some exemplary implementation manners of the present disclosure, the to-be-processed task may be a task currently waiting to be processed. The memory segments may be a plurality of memory segments required during execution of the to-be-processed task. The operation platform may be a platform that executes the to-be-processed task. The operation core may be a processor core in the operation platform.

Before memory allocation, the to-be-processed task may be determined first. The to-be-processed task may be various types of test tasks. For example, the to-be-processed task may be various software test tasks and hardware test tasks. In a DDR memory application scenario, the to-be-processed task may be a DDR system-level test task. Due to task characteristics of the DDR system-level test, before the DDR system-level test is performed, corresponding memory segments may be allocated to the DDR system-level test according to the task characteristics of the DDR system-level test. Therefore, before the to-be-processed task is performed, the plurality of memory segments corresponding to the to-be-processed task may be obtained first. In addition, the current processing of the DDR system-level test task is generally performed by using a processing platform including a plurality of operation cores. Therefore, the plurality of operation cores in the processing platform may be determined, and then the plurality of memory segments are allocated to the plurality of operation cores in the processing platform.

In an exemplary implementation solution of the present disclosure, the to-be-processed task is obtained, and a task operating requirement of the to-be-processed task is determined; a specified operating environment corresponding to the to-be-processed task is determined according to the task operating requirement; and a plurality of memory segments corresponding to the to-be-processed task in the specified operating environment are determined.

The task operating requirement may be a specific requirement during operating of the to-be-processed task. The specified operating environment may be an operating environment used during execution of the to-be-processed task.

After the to-be-processed task is determined, the task operating requirement corresponding to the to-be-processed task can be determined first. For example, the task operating requirement of the DDR system-level test task may include an anticipated task of task execution, an operating environment of task execution, specific steps of task execution, and other content. After the task operating requirement is obtained, the specified operating environment corresponding to the to-be-processed task may be determined according to the task operating requirement. For example, the DDR system-level test generally may be performed in a UEFI environment. That is, the specified operating environment of the to-be-processed task may be the UEFI environment. In the UEFI environment, the memory generally may be divided into a plurality of different memory segments. Before the memory allocation, the corresponding a plurality of memory segments in the UEFI environment may be obtained first, so as to allocate these memory segments.

In an exemplary implementation solution of the present disclosure, a memory configuration file corresponding to the specified operating environment is obtained, and a corresponding memory type is determined according to the memory configuration file, where the memory type has corresponding segmental memories; respective memory capacities corresponding to the segmental memories are configured, to generate memory segments corresponding to the segmental memories respectively.

The memory configuration file may be a configuration file on which memory configuration of the to-be-processed task is based. The memory type may be a specific type of the memory. The segmental memory may be a memory segment corresponding to a certain memory type. The memory capacity may be a specific capacity value of the memory segment.

During determining of the plurality of memory segments corresponding to the to-be-processed task in the specified operating environment, a memory configuration file of the to-be-processed task in the specified operating environment may be obtained first. The memory configuration file may include the memory type in the specified operating environment, specific purposes of different memory types, and other content. Since the DDR system-level test task is generally performed in the UEFI environment, a memory configuration file of the DDR system-level test in the UEFI environment is obtained. In the UEFI environment, the processing platform may generally divide the memory into different types of segmental memories according to memory purposes. Specifically, variant EFI_MEMORY_TYPE may be defined in the memory configuration file in the UEFI environment.

```
typedef enum{
EfiReservedMemoryType=0, //reserved type, not used
EfiLoaderCode, //code allocated to OS Loader
EfiLoaderData, //data allocated to OS Loader, a default
    type during memory allocation for the application
EfiBootServicesCode, //code area of boot service drive/
    application
EfiBootServicesData, //data area of boot service drive/
    application, a default type during memory allocation
    for the BS drive
EfiRuntimeServicesCode, //code area of runtime service
    drive
EfiRuntimeServicesData, //runtime service drive, a
    default type during memory allocation for the RS drive
EfiConventionalMemory, //allocable memory
EfiUnusableMemory, //the memory area has an error and
    is unusable
EfiACPIReclaimMemory, //for storing an ACPI table
EfiACPIMemoryNVS, //reserved for firmware
EfiMemoryMappedIO, //memory mapping I/O, which can
    be used by the runtime service
EfiMemoryMappedIOPortSpace, //memory mapping I/O,
    used by the CPU for switching from a memory cycle to
    an IO cycle
EfiPalCode, //reserved for firmware
EfiMaxMemory Type
}EFI_MEMORY_TYPE;
```

By enumerating types, the variant EFI_MEMORY_TYPE defines a plurality of memory types in the UEFI environment. Each memory type has a corresponding segmental memory. After the segmental memories are determined, a corresponding memory capacity may be configured for each segmental memory, to generate the corresponding memory segments in the UEFI environment, thereby performing memory allocation. Specifically, after boot-up of the operation platform, only type 7 is idle memory segments available for testing. The memory segments are distributed as follows.

Address: 0x0--0x9e000, (632 K) (buffer type: 7)
Address: 0x100000--0x4ae2a000 (1225896 K) (buffer type: 7)
Address: 0x4af2a000--0x5ca4a000, (289920 K) (buffer type: 7)
Address: 0x5cc290000--0x60b0f000, (64408 K) (buffer type: 7)
Address: 0x614d6000--0x61574000, (632 K) (buffer type: 7)
Address: 0x615f7000--0x61636000, (252 K) (buffer type: 7)
Address: 0x65c29000--0x66044000, (4204 K) (buffer type: 7)
Address: 0x6e200000--0x6e3d7000, (1884 K) (buffer type: 7)
Address: 0x6ffff000--0x70000000, (4K) (buffer type: 7)
Address: 0x1000000000--0x6040000000, (399507456K) (buffer type: 7)

It can be known from the specific distribution of the memory segments that, the first 9 test segments have relatively small memory capacities, and the tenth test segment has an extremely large memory capacity.

In an exemplary implementation solution of the present disclosure, in response to a boot-up instruction of the operation platform, the specified operating environment is entered according to the task operating requirement; a system operation file in the specified operating environment is obtained, and the memory configuration file is obtained from the system operation file.

The boot-up instruction may be a corresponding instruction for booting up the operation platform. The system operation file may be a folder for storing main folders of the operating system of the operation platform.

Because the memory configuration file may be a configuration file in the specified operating environment, before the memory configuration file is obtained, the operation platform may be boot up first, so that the operation platform enters the specified operating environment. For example, the operation platform generally performs the DDR system-level test in the UEFI environment. When the operation platform is controlled to boot, a boot-up instruction may be sent to the operation platform. In response to the boot-up instruction, the operation platform may enter the UEFI environment according to the task operating requirement after the boot-up.

After the operation platform enters the UEFI environment, the system operation file of the operation platform in the UEFI environment can be obtained. The system operation file may be a folder for storing main files of the platform operating system. The system operation file is generally created automatically during installation of the platform operating system, and the related files are stored in the corresponding folder. Most of the system operation files are not allowed to be changed arbitrarily. After the system operation file in the UEFI environment is obtained, the memory configuration file can be obtained from the system operation file, so as to determine the plurality of memory segments of the DDR system-level test task in the UEFI environment according to the memory configuration file and allocate the plurality of memory segments to the plurality of operation cores in the operation platform.

In step S120, the first-capacity memory segment and the second-capacity memory segment in the plurality of memory segments are determined according to the plurality of operation cores; the memory capacity of the second-capacity memory segment is higher than the memory capacity of the first-capacity memory segment.

In some exemplary implementation manners of the present disclosure, the first-capacity memory segment may be a memory segment whose memory capacity is less than a memory division reference value, i.e., a small memory segment. The second-capacity memory segment may be a memory segment whose memory capacity is greater than or equal to the memory division reference value, i.e., a large memory segment.

After the plurality of memory segments of the DDR system-level test task in the UEFI environment and the memory cores in the operation platform are determined, the plurality of memory segments may be further classified according to memory cores, to classify the memory segments into the first-capacity memory segment and the second-capacity memory segment. In this memory classification process, the memory may be classified according to a pre-configured memory division rule, so that the plurality of memory segments are allocated to the plurality of operation cores according to an obtained classification result.

In an exemplary implementation solution of the present disclosure, a total memory capacity corresponding to the plurality of memory segments is determined; an operation core quantity of the operation platform is determined; a memory division reference value is determined according to the total memory capacity and the operation core quantity, where the memory division reference value=total memory capacity/the operation core quantity; the first-capacity memory segment and the second-capacity memory segment are determined according to the memory division reference value.

The total memory capacity may be a sum of capacities of the plurality of memory segments. The operation core quantity is the quantity of operation cores in the operation platform. The memory division reference value may be a memory reference value for distinguishing the first-capacity memory segment from the second-capacity memory segment. The memory division reference value may be determined according to the total memory capacity and the operation core quantity.

After the plurality of memory segments of the DDR system-level test task in the UEFI environment are determined, the memory capacities of the plurality of memory segments may be added up to obtain the total memory capacity of the plurality of memory segments. Assuming that the total memory capacity is Q and the quantity of the operation cores in the operation platform is U, the size of memory to be tested by each operation core is Q/U=P on average.

Figure 2:
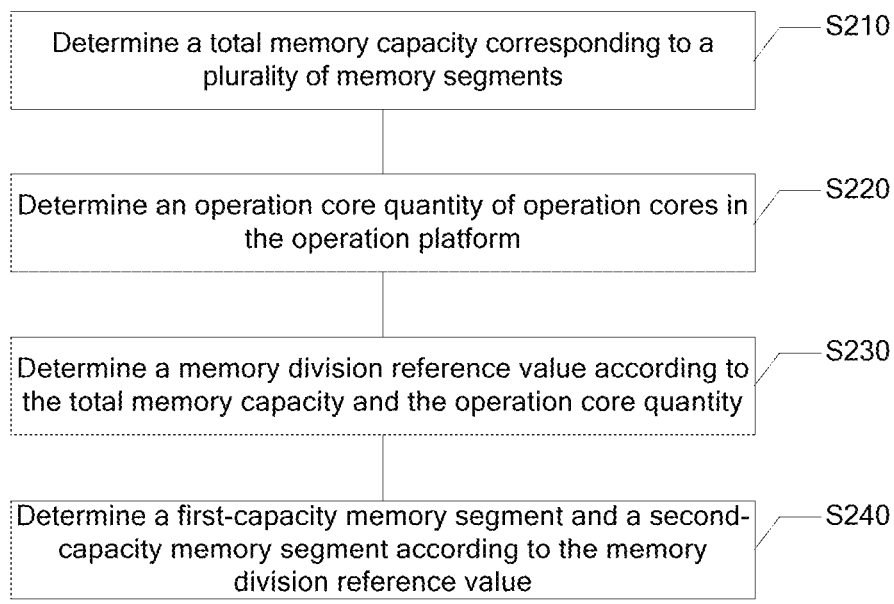
FIG. 2 is a flowchart of determining a first-capacity memory segment and a second-capacity memory segment according to an exemplary implementation of the present disclosure.
Figure 3:
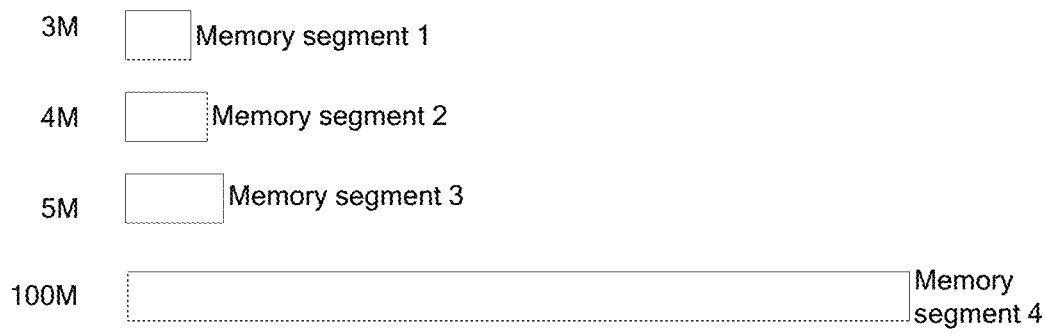
FIG. 3 is a schematic diagram of respective memory capacities corresponding to a plurality of memory segments according to an exemplary implementation of the present disclosure.

Referring to FIG. 2, FIG. 2 is a flowchart of determining a first-capacity memory segment and a second-capacity memory segment according to an exemplary implementation of the present disclosure. Step S210: Determine a total memory capacity corresponding to the plurality of memory segments. Referring to FIG. 3, FIG. 3 is a schematic diagram of respective memory capacities corresponding to a plurality of memory segments according to an exemplary implementation of the present disclosure. According to FIG. 3, the DDR system-level test task includes four memory segments in the UEFI environment: a memory segment 1, a memory segment 2, a memory segment 3, and a memory segment 4, and sizes of the four memory segments are 3M, 4M, 5M, and 100M respectively. In this case, the total memory capacity of the four memory segments is 112M.

Step S220: Determine an operation core quantity of the operation cores in the operation platform. After the total memory capacity is determined, the specific quantity of the operation cores in the operation platform may be determined. In this embodiment, the operation platform includes a total of eight operation cores. Therefore, the operation core quantity is 8, that is, the eight cores are used for testing 3+4+5+100=112 MB jointly.

Step S230: Determine a memory division reference value according to the total memory capacity and the operation core quantity. After the total memory capacity and the operation core quantity are determined, the memory division reference value may be determined according to the total memory capacity and the operation core quantity. Specifically, division calculation may be performed according to the total memory capacity and the operation core quantity, to determine the memory division reference value. In this case, the memory division reference value is 14M, and each core is used for testing 112/8=14M on average.

Step S240: Determine the first-capacity memory segment and the second-capacity memory segment according to the memory division reference value. After the memory division reference value is determined, the first-capacity memory segment and the second-capacity memory segment may be determined according to the memory division reference value, so as to perform memory allocation processing for the first-capacity memory segment and the second-capacity memory segment separately.

In an exemplary implementation solution of the present disclosure, a memory segment of which the memory capacity is less than the memory division reference value is determined as the first-capacity memory segment, a memory segment of which the memory capacity is greater than or equal to the memory division reference value is determined as the second-capacity memory segment.

For example, for the four memory segments above, the memory segment 1, the memory segment 2, and the memory segment 3 are determined as the first-capacity memory segments; the memory segment 4 is determined as the second-capacity memory segment. By classifying the memory segments according to the memory division reference value, the plurality of memory segments can be classified into a small memory segment and a large memory segment.

It can be easily understood by those skilled in the art that, the specific value of the memory capacity of the memory segment and the operation core quantity of the operation platform may also be determined according to practical operation condition. The memory capacity of the memory segment and the specific quantity of operation cores are not specifically limited.

In step S130, the first-capacity memory segments are allocated to the operation cores one by one, and the respective remaining memory capacities corresponding to the operation cores are determined.

In some exemplary implementation manners of the present disclosure, the remaining memory capacity may be a current remaining memory capacity of the operation core.

In the existing test method of the multicore platform, the memory segments are generally traversed one by one according to an order of the memory segments and are allocated to the operation cores. The specific allocation method is as follows: in the UEFI environment, traversing type-7 (conventional) memory segments from front to back, to evenly allocate a memory segment of a certain size to each operation core. However, in some DRAM test algorithms, test time of the small memory segment and large memory segment does not change linearly. In other words, it takes a longer time to test ten 20M memory segments than to test one 200M memory segment. In a memory map (MemoryMap) generated by the system, small memory segments are generally arranged at the front, and the largest memory segment is arranged at the end.

If the memory is allocated from front to back according to the conventional method, a plurality of small memory segments are allocated to the same operation core. The specific allocation method is as follows: the operation core 1 obtains memory segment 1 (3M)+ memory segment 2 (4M)+ memory segment 3 (5M)+ memory segment 4 (2M)=14M; then, the operation core 2 to operation core 8 all obtain 14M memory from the memory segment 4 for testing. However, for some DRAM test algorithms, it takes a longer time for a core to test multiple discontinuous small segments than to test a small segment of the same size as the multiple discontinuous small segments. As a result, the operation core 1 is slower than the operation core 2 to operation core 8, resulting in an increase in the total test time.

To avoid the problem existing in the conventional memory allocation scheme and avoid allocating small memory segments to the same core, during memory allocation in this embodiment, the first-capacity memory segments (that is, small memory segments) may be first allocated to different operation cores one by one, to prevent the plurality of small memory segments from being allocated to the same operation core. After the first-capacity memory segments (that is, small memory segments) are allocated, the current remaining memory capacity of each operation core in the operation platform may be determined, so as to allocate the second-capacity memory segment.

In an exemplary implementation solution of the present disclosure, a preset arrangement order of the each first-capacity memory segment is used as a memory segment arrangement order of the each first-capacity memory segment; an operation core arrangement order of the plurality of operation cores is obtained, and each first-capacity memory segment is allocated to the operation cores one by one according to the memory segment arrangement order and the operation core arrangement order.

The memory segment arrangement order may be an order determined after each memory segment is sorted according to a particular sorting rule. The operation core arrangement order may be an order determined after the plurality of operation cores are sorted according to operation core IDs.

After the first-capacity memory segments are determined according to the memory division reference value, the plurality of first-capacity memory segments may be sorted according to the memory capacities. For example, each first-capacity memory segment is sorted in ascending order of the memory capacities, to obtain the memory segment arrangement order of the first-capacity memory segments. For the four memory segments in FIG. 3, the memory segment 1, memory segment 2, and memory segment 3 are first-capacity memory segments. The order of the three memory segments is obtained by sorting according to the memory capacities, and therefore can be directly used as the memory segment arrangement order.

Further, an order of the plurality of operation cores in the operation platform may be determined. For example, the operation cores in the operation platform generally may be sorted according to an alphabetical order of operation core IDs, to obtain the corresponding operation core arrangement order. For example, this embodiment includes eight operation cores; therefore, the eight operation core can be sorted according to the digital IDs thereof. After the memory segment arrangement order and the operation core arrangement order are determined, the plurality of first-capacity memory segments may be allocated to the operation cores one by one according to the memory segment arrangement order and the operation core arrangement order.

In an exemplary implementation solution of the present disclosure, a memory segment Id corresponding to the each first-capacity memory segment is determined according to the memory segment arrangement order; an operation core ID corresponding to each of the operation cores is determined according to the operation core arrangement order; an operation core quantity is obtained, and a memory allocation ID is determined according to the operation core quantity and the memory segment ID; and the each first-capacity memory segment is allocated to the corresponding operation cores according to the memory allocation Id and the operation core ID.

The memory segment ID may be an ID corresponding to each memory segment. The operation core ID may be an ID corresponding to each operation core. The memory allocation ID may be an ID corresponding to allocation of a memory segment.

Figure 4:
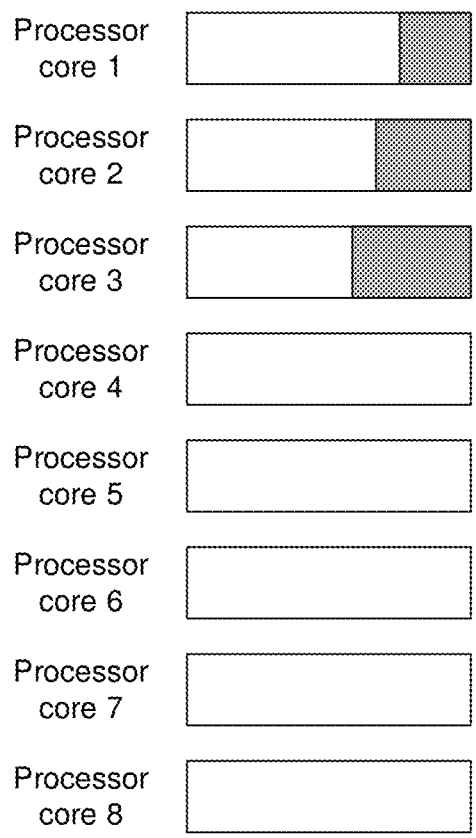
FIG. 4 is a schematic diagram of allocating a plurality of memory segments to a plurality of operation cores according to an exemplary implementation of the present disclosure.

Referring to FIG. 4, FIG. 4 is a schematic diagram of allocating a plurality of memory segments to a plurality of operation cores according to an exemplary implementation of the present disclosure. With reference to FIG. 3 and FIG. 4, the quantity of the first-capacity memory segments is 3, and the corresponding memory segment IDs are 1, 2, and 3 respectively; the quantity of the operation cores is 8, and the operation core IDs are 1, 2, 3, 4, 5, 6, 7, and 8 respectively. During memory allocation, the memory allocation ID may be determined according to the operation core quantity and the memory segment ID. This embodiment involves a large quantity of operation cores, and in the process of allocating the first-capacity memory segments one by one to the operation cores in the operation platform, the memory allocation ID is the same as the memory segment ID. In this case, not every operation core can be allocated with a first-capacity memory segment, and the case where the operation core is allocated with 0 first-capacity memory segment also falls in the protection scope of the present disclosure. Through the foregoing processing, the small memory segments can be evenly distributed among the operation cores, to avoid allocating a plurality of small memory segments to the same operation core.

It can be easily understood by a person skilled in the art that, in other embodiments of the present disclosure, the quantity of operation cores may be less than the quantity of first-capacity memory segments (the quantity of small memory segments); in this case, a remainder calculation operation may be performed on the quantity of operation cores and the quantity of small memory segments, to determine memory allocation ID according to the remainder calculation result. After the memory allocation ID corresponding to each first-capacity memory segment is determined, the each first-capacity memory segment may be allocated to the corresponding operation cores according to the memory allocation Id and the operation core ID.

In an exemplary implementation solution of the present disclosure, an allocated first-capacity memory segment in the operation cores is determined, and an occupied memory capacity of the operation cores is determined according to the allocated first-capacity memory segment; the memory division reference value is obtained, and the remaining memory capacity is determined according to the memory division reference value and the occupied memory capacity.

The occupied memory capacity may be an occupied capacity after the memory is allocated to the operation cores.

After the foregoing processing, during allocation of memory to the operation core 1 to operation core U one by one, the remaining memory capacity of each operation core may be further determined after the first-capacity memory segments (small memory segments) are allocated to the operation cores. Specifically, the first-capacity memory segment already allocated to each operation core is determined, and the occupied memory capacity of the operation core is determined according to the first-capacity memory segment. Since the plurality of operation cores in the operation platform jointly process all the memory segments, the memory processing capacity corresponding to each operation core is equal to the memory division reference value. That is, the operation core 1 to operation core 8 in this embodiment each have a memory processing capacity of 14M. The remaining memory capacity of each operation core can be determined according to the memory division reference value and the occupied memory capacity, so as to obtain a memory segment of a correspond size from the second-capacity memory segment according to the remaining memory capacity for memory allocation, thereby completing the memory allocation processing for the operation cores.

It can be learned from FIG. 4 that, the occupied memory capacity of the operation core 1 is 3M, and therefore the remaining memory capacity is 11M; the occupied memory capacity of the operation core 2 is 4M, and therefore the remaining memory capacity is 10M; the occupied memory capacity of the operation core 3 is 5M, and therefore the remaining memory capacity is 9M. No small memory segment is allocated to the operation core 4 to operation core 8; therefore, the remaining memory capacities corresponding to the operation core 4 to operation core 8 are each 14M.

In step S140, the second-capacity memory segment is allocated to the operation cores according to the remaining memory capacities, to obtain the memory allocation result.

In some exemplary implementation manners of the present disclosure, the memory allocation result may be a result obtained after the plurality of memory segments are allocated to the plurality of memory cores.

Once all the first-capacity memory segments (that is, small memory segments) are allocated to the operation cores, the second-capacity memory segment can be allocated. In this case, the size of memory to be obtained from the second-capacity memory segment can be determined according to the remaining memory capacity of each operation core, and the memory is allocated to the corresponding operation core, to eventually obtain the memory allocation result.

Specifically, the memory capacity M of the second-capacity memory segment (that is, large memory segment) is generally much greater than P, that is, M>>P. The size of the first capacity memory segment allocated in each operation core is N. After allocation of the first-capacity memory segments (small memory segments) is finished, the rest of the operation cores can all obtain memory from the second-capacity memory segment (large memory segment), and the size of the memory segment further required by each operation core is P-N.

In an exemplary implementation solution of the present disclosure, the operation core arrangement order of the plurality of operation cores is obtained; and a remaining memory allocation step is performed for the operation cores one by one according to the remaining memory capacities and the operation core arrangement order, so as to allocate the second-capacity memory segment to the operation cores.

In this embodiment, the eight operation cores of the operation platform are sorted according to the operation core IDs, and have a corresponding operation core arrangement order. After the remaining memory capacity corresponding to each operation core is determined, the remaining memory allocation step may be performed for the operation cores one by one according to the remaining memory capacities and the operation core arrangement order, so as to allocate the second-capacity memory segment to the operation cores. For example, for the eight operation cores, memory of the same size as the remaining memory capacity is obtained from the second-capacity memory segment and allocated to the corresponding operation core, to complete allocation of all the memory segments.

In an exemplary implementation solution of the present disclosure, the remaining memory allocation step includes: obtaining a current operation core and a current-core remaining memory capacity corresponding to the current operation core; determining, from the second-capacity memory segment, a remaining memory segment corresponding to the current operation core, where the remaining memory segment is a partial memory segment, which is the same as the current-core remaining memory capacity, in the second-capacity memory segment; and allocating the remaining memory segment to the current operation core.

The current operation core may be a memory core in the current memory allocation operation. The current-core remaining memory capacity may be the memory capacity in the current operation core, that is, unoccupied memory capacity.

The remaining memory allocation step is performed on all the operation cores of the operation platform one by one. Specifically, one operation core may be first taken as the current operation core, and the current-core remaining memory capacity of the current operation core is determined. Referring to FIG. 4, the operation core 1 is used as the current operation core, because the remaining memory capacity of the operation core 1 is 11M, the current-core remaining memory capacity is 11M. During remaining memory allocation, a remaining memory segment may be determined from the second-capacity memory segment. In this case, the second-capacity memory segment, namely, the memory segment 4, has a memory capacity of 100M, a memory segment with the size of 11M is taken from 100M to serve as the remaining memory segment, and the remaining memory segment is allocated to the operation core 1, to complete memory allocation for the operation core 1.

Similarly, for the operation core 2, after the first-capacity memory segment is allocated to the operation core 2, the current-core remaining memory capacity of the operation core 2 is 10M; therefore, 10M memory is obtained from the memory segment 4 and allocated to the operation core 2. For the operation core 3, after the first-capacity memory segment is allocated to the operation core 3, the current-core remaining memory capacity of the operation core 3 is 9M; therefore, 9M memory is obtained from the memory segment 4 and allocated to the operation core 3. At this point, allocation of the first-capacity memory segments is completed. Therefore, the operation core 4 to the operation core 8 each obtain a memory segment of 14M from the memory segment 4 for allocation. In this way, each operation core can test two memory segments at most, thereby improving the test efficiency.

In an exemplary implementation solution of the present disclosure, an occupied memory capacity and a memory start address of the current operation core are obtained; a memory intermediate address corresponding to the current operation core is determined according to the memory start address and the occupied memory capacity; and a start address corresponding to the remaining memory segment is determined according to the memory intermediate address.

The occupied memory capacity may be a capacity already occupied in the operation core. The memory start address may be a corresponding start address during memory allocation for the operation core. The memory intermediate address may be an end address corresponding to the first-capacity memory segment after the first-capacity memory segment is allocated to the current operation core. The start address corresponding to the remaining memory segment may be a corresponding memory start address for allocation of the remaining memory segment to the operation core.

When the remaining memory segment is allocated to the current operation core, memory allocated to some operation cores comes from different memory segments. Therefore, in order to ensure address continuity of memory tested by the current operation core, memory addresses of different memory segments may be determined for each operation core. For example, in memory address allocation for the operation core 1, the memory start address of the operation core 1 may be 0. After the memory segment 1 is allocated to the operation core 1, since the memory size of the memory segment 1 is 3M, the memory intermediate address of the memory segment 1 in the operation core 1 is 3M−1. Then, the remaining memory segment (that is, memory segment of 11M) is obtained from the memory segment to continue to allocate memory to the operation core 1. The start address of the 11M remaining memory segment begins with 3M, to ensure the address continuity of memory tested in the same operation core.

Figure 5:
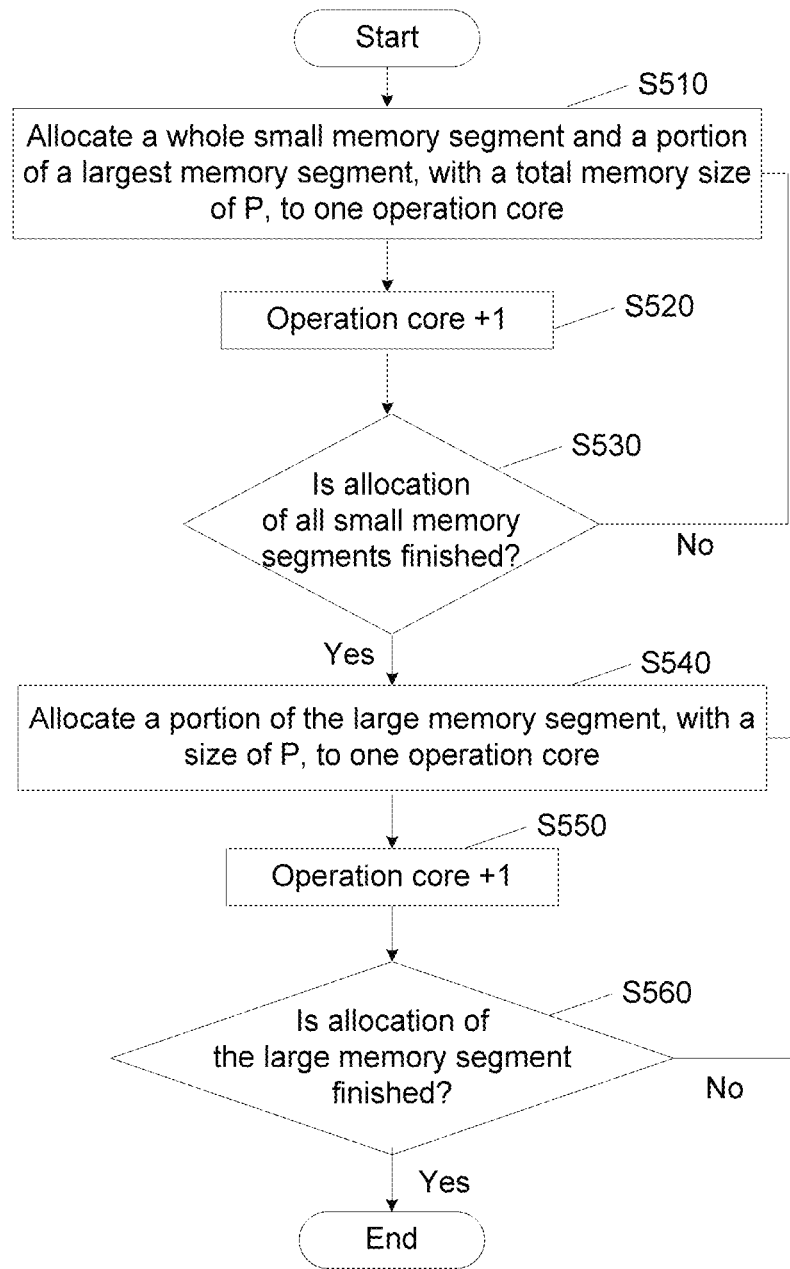
FIG. 5 is an overall flowchart of allocating a plurality of memory segments to a plurality of operation cores according to an exemplary implementation of the present disclosure.

In other embodiments of the present disclosure, memory allocation may further be performed through the following steps. In such a memory allocation manner, memory is allocated to each operation core one by one. After memory allocation for one operation core is finished, memory allocation for the next operation core begins. Referring to FIG. 5, FIG. 5 is an overall flowchart of allocating a plurality of memory segments to a plurality of operation cores according to an exemplary implementation of the present disclosure. Step S510: Allocate a whole small memory segment and a portion of a largest memory segment (with a total memory size of P) to one operation core, where P is a memory division reference value. After memory allocation for one operation core is finished, memory allocation processing is performed on the next operation core. Step S520: Move on to a next operation core, that is, continue to process the next operation core.

Step S530: Determine whether all small memory segments have been allocated. If allocation of the small memory segments is not finished, step S510 is performed again, until all the small memory segments are allocated. After allocation of the small memory segments is finished, only the large memory segment remains. In this case, step S540 may be performed, to obtain partial memory (with a size of P) from the large memory segment, to be allocated to one operation core. After memory allocation for the current operation core is finished, step S550 is performed to move on to a next operation core, to perform memory allocation processing for the operation core. Step S560: Determine whether allocation of the large memory segment is finished. If the allocation of the large memory segment is finished, the whole memory allocation process is ended; otherwise, step S540 is continuously performed, until all the memory segments are allocated to the corresponding operation cores.

In an exemplary implementation solution of the present disclosure, the to-be-processed task is executed in the specified operating environment according to the memory allocation result.

After the plurality of memory segments are evenly allocated to the corresponding operation core to obtain the memory allocation result, the to-be-processed task may be executed in the specified operating environment according to the memory allocation result, i.e., the DDR system-level test is performed in the UEFI environment. In the memory allocation result obtained through the memory allocation scheme in the present disclosure, the small memory segments are evenly distributed among the operation cores, which generally avoids the case where one operation core includes a plurality of small memory segments. Therefore, the present disclosure ensures, to the maximum extent possible, that all operation cores start and end test tasks simultaneously, avoids wasting resources of the operation cores, and effectively improves the task running efficiency.

It should be noted that the terms such as "first" and "second" used in the present disclosure are merely for distinguishing memory segments with different memory capacities, but should not cause any limitation to the present disclosure.

In conclusion, a plurality of memory segments corresponding to a to-be-processed task are obtained, and a plurality of operation cores in an operation platform that executes the to-be-processed task are determined; a first-capacity memory segment and a second-capacity memory segment in the plurality of memory segments are determined according to the plurality of operation cores, where a memory capacity of the second-capacity memory segment is larger than that of the first-capacity memory segment; each first-capacity memory segment is allocated to the operation cores, and remaining memory capacities corresponding to the operation cores respectively are determined; and the second-capacity memory segment is allocated to the operation cores according to the remaining memory capacities, to obtain a memory allocation result. On one hand, this memory allocation manner can ensure that each operation core is allocated with a certain amount of segmental memory. The memory allocation scheme of the DDR system-level test, the memory segments can be evenly allocated to the operation cores. On the other hand, the memory allocation based on the operation core quantity ensures the uniformity of memory segments allocated to the operation cores, which ensures, to the maximum extent possible, that all operation cores start and end test tasks simultaneously, thereby avoiding wasting resources of the operation cores, and effectively improving the task running efficiency.

It should be noted that although the steps of the method in the present disclosure are described in the drawings in a particular sequence, it is not required or implied that the steps must be performed in that particular sequence or that all of the steps shown must be performed to achieve the desired results. Additionally or alternatively, some steps may be omitted, a plurality of steps may be combined into a single step for execution, and/or a single step may be divided into a plurality of steps for execution.

Figure 6:
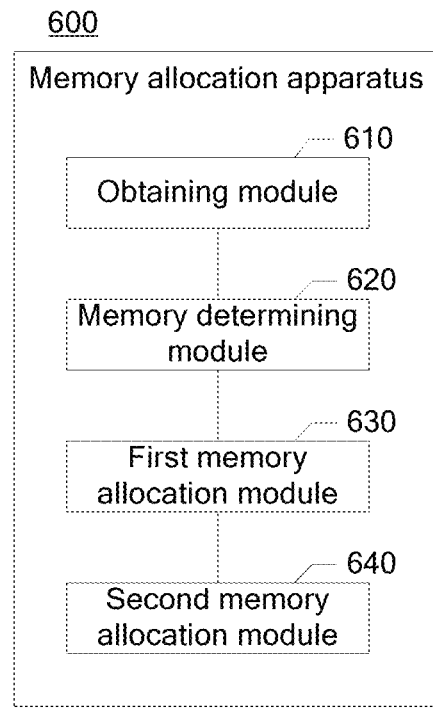
FIG. 6 is a block diagram of a memory allocation apparatus according to an exemplary embodiment of the present disclosure.

In addition, in an exemplary embodiment, a memory allocation apparatus is further provided. Referring to FIG. 6, the memory allocation apparatus 600 may include: an obtaining module 610, a memory determining module 620, a first memory allocation module 630, and a second memory allocation module 640.

Specifically, the obtaining module 610 is configured to obtain a plurality of memory segments corresponding to a to-be-processed task, and determine a plurality of operation cores in an operation platform that executes the to-be-processed task; the memory determining module 620 is configured to determine a first-capacity memory segment and a second-capacity memory segment in the plurality of memory segments according to the plurality of operation cores, where a memory capacity of the second-capacity memory segment is larger than that of the first-capacity memory segment; the first memory allocation module 630 is configured to allocate each first-capacity memory segment to the operation cores one by one, and determine remaining memory capacities corresponding to the operation cores respectively; and the second memory allocation module 640 is configured to allocate the second-capacity memory segment to the operation cores according to the remaining memory capacities, to obtain a memory allocation result.

In an exemplary implementation solution of the present disclosure, the memory allocation apparatus further includes a memory segment determining module, configured to obtain the to-be-processed task, and determine a task operating requirement of the to-be-processed task; determine a specified operating environment corresponding to the to-be-processed task according to the task operating requirement; and determine the plurality of memory segments corresponding to the to-be-processed task in the specified operating environment.

In an exemplary implementation solution of the present disclosure, the memory segment determining module includes a memory segment determining unit, configured to obtain a memory configuration file corresponding to the specified operating environment, and determine a corresponding memory type according to the memory configuration file, where the memory type has corresponding segmental memories; and configure respective memory capacities corresponding to the segmental memories, to generate memory segments corresponding to the segmental memories respectively.

In an exemplary implementation solution of the present disclosure, the memory segment determining unit includes a file obtaining sub-unit, configured to enter the specified operating environment according to the task operating requirement in response to a boot-up instruction of the operation platform; and obtain a system operation file in the specified operating environment, and obtain the memory configuration file from the system operation file.

In an exemplary implementation solution of the present disclosure, the memory determining module includes a memory division unit, configured to determine a total memory capacity corresponding to the plurality of memory segments; determine an operation core quantity of the operation platform; determine a memory division reference value according to the total memory capacity and the operation core quantity, where the memory division reference value=the total memory capacity/the operation core quantity; and determine the first-capacity memory segment and the second-capacity memory segment according to the memory division reference value.

In an exemplary implementation solution of the present disclosure, the memory division unit includes a memory division sub-unit, configured to determine a memory segment of which the memory capacity is less than the memory division reference value as the first-capacity memory segment; and determine a memory segment of which the memory capacity is greater than or equal to the memory division reference value as the second-capacity memory segment.

In an exemplary implementation solution of the present disclosure, the quantity of the first-capacity memory segments is two or more, and the first memory allocation module includes a first memory allocation unit, configured to use a preset arrangement order of the each first-capacity memory segment as a memory segment arrangement order of the each first-capacity memory segment; and obtain an operation core arrangement order of the plurality of operation cores, and allocate each first-capacity memory segment one by one to the operation cores according to the memory segment arrangement order and the operation core arrangement order.

In an exemplary implementation solution of the present disclosure, the first memory allocation unit includes a first memory allocation sub-unit, configured to determine a memory segment ID corresponding to the each first-capacity memory segment according to the memory segment arrangement order; determine an operation core ID corresponding to each of the operation cores according to the operation core arrangement order; obtain an operation core quantity, and determine a memory allocation ID according to the operation core quantity and the memory segment ID; and allocate the each first-capacity memory segment to the corresponding operation cores according to the memory allocation ID and the operation core ID.

In an exemplary implementation solution of the present disclosure, the first memory allocation module further includes a remaining memory capacity determining unit, configured to determine an allocated first-capacity memory segment in the operation cores, and determine an occupied memory capacity of the operation cores according to the allocated first-capacity memory segment; and obtain the memory division reference value, and determine the remaining memory capacity according to the memory division reference value and the occupied memory capacity.

In an exemplary implementation solution of the present disclosure, the second memory allocation module includes a second memory allocation unit, configured to obtain an operation core arrangement order of the plurality of operation cores; perform a remaining memory allocation step for the operation cores one by one according to the remaining memory capacities and the operation core arrangement order, so as to allocate the second-capacity memory segment to the operation cores.

In an exemplary implementation solution of the present disclosure, the second memory allocation unit includes a second memory allocation sub-unit, configured to obtain a current operation core and a current-core remaining memory capacity corresponding to the current operation core; determine, from the second-capacity memory segment, a remaining memory segment corresponding to the current operation core, where the remaining memory segment is a partial memory segment, which is the same as the current-core remaining memory capacity, in the second-capacity memory segment; and allocate the remaining memory segment to the current operation core.

In an exemplary implementation solution of the present disclosure, the second memory allocation sub-unit is configured to: obtain an occupied memory capacity and a memory start address of the current operation core; determine a memory intermediate address corresponding to the current operation core according to the memory start address and the occupied memory capacity; and determine a start address corresponding to the remaining memory segment according to the memory intermediate address.

In an exemplary implementation solution of the present disclosure, the memory allocation apparatus further includes a task execution module, configured to execute the to-be-processed task in the specified operating environment according to the memory allocation result.

The specific details of each virtual module of the memory allocation apparatus are described in detail in the corresponding memory allocation method, and will not be repeated here.

It should be noted that although several modules or units of the memory allocation apparatus are mentioned in the above description, such division of modules or units is not mandatory. In fact, according to the implementations of the present disclosure, the features and functions of two or more modules or units described above may be embodied in one module or unit. Correspondingly, the features and functions of a module or unit described above may be further divided into a plurality of modules or units to be embodied.

An exemplary embodiment of the present disclosure further provides an electronic device that can be configured to implement the foregoing method.

Those skilled in the art can understand that aspects of the present disclosure may be implemented as systems, methods, or program products. The aspects of the present disclosure may be specifically implemented in a form of a fully hardware embodiment, a fully software embodiment (including firmware, microcode, or the like), or a combination of hardware and software, which may be collectively referred to as a "circuit", "module", or "system".

An electronic device 700 according to the embodiment of the present disclosure is described below with reference to FIG. 7. The electronic device 700 shown in FIG. 7 is only an example, which should not be construed as any limitation on the function and application scope of the embodiment of the present disclosure.

Figure 7:
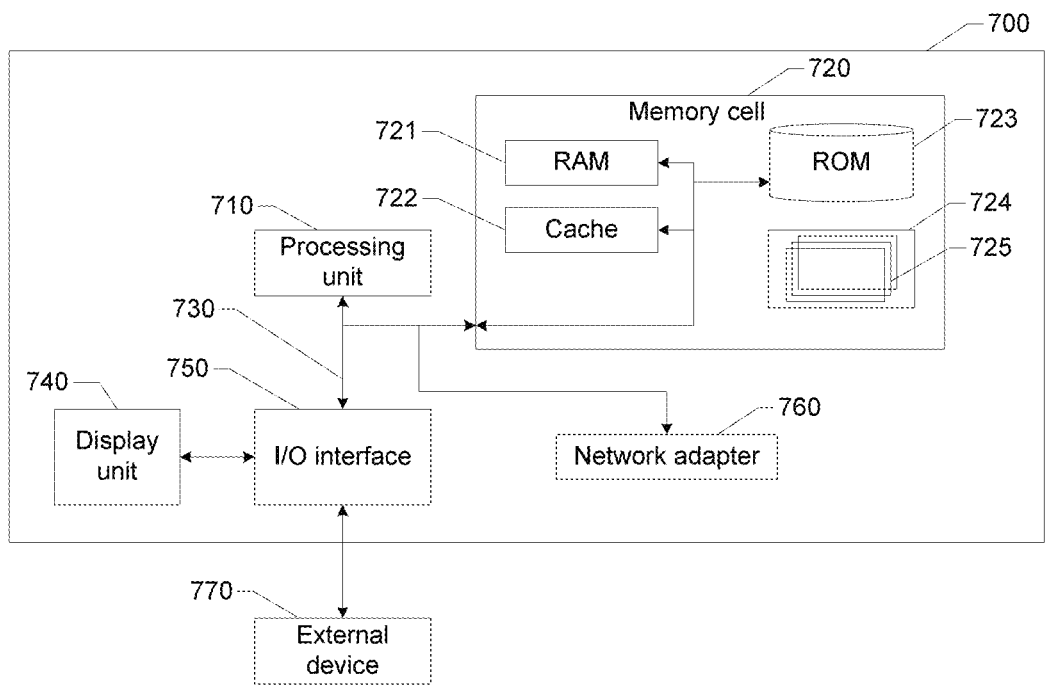
FIG. 7 is a block diagram of an electronic device according to an exemplary embodiment of the present disclosure.

As shown in FIG. 7, the electronic device 700 is represented in the form of a general purpose computer. Components of the electronic device 700 may include, but are not limited to, at least one processing unit 710, at least one memory cell 720, a bus 730 connecting different system components (including the memory cell 720 and the processing unit 710), and a display unit 740.

The storage unit stores program code. The program code may be executed by the processing unit 710 to cause the processing unit 710 to perform the steps according to the various exemplary embodiments of the present disclosure described in the foregoing "exemplary methods" of this specification.

The memory cell 720 may include a readable medium in the form of a volatile memory cell, for example, a random access memory cell (RAM) 721 and/or a cache memory cell 722, and may further include a read-only memory cell (ROM) 723.

The memory cell 720 may include a program/utility 724 including a set of (at least one) program modules 725, and the program module 725 includes, but is not limited to: an operating system, one or more applications, other program modules and program data. Each of these examples or some combination thereof may include an implementation of a network environment.

The bus 730 may represent one or more of several types of bus structures, including a memory cell bus or a memory cell controller, a peripheral bus, a graphics acceleration port, a processing unit, or a local area bus using any of a plurality of bus structures.

The electronic device 700 may further communicate with one or more external devices 770 (for example, a keyboard, a pointing device, or a Bluetooth device), with one or more devices that enable a user to interact with the electronic device 700, and/or with any device that enables the electronic device 700 to communicate with one or more other computing devices (for example, a router or a modem). Such communication may be performed through an input/output (I/O) interface 750. The electronic device 700 may further communicate with one or more networks (for example, a local area network (LAN), a wide area network (WAN), and/or a public network such as the Internet) through a network adapter 760. As shown in the figure, the network adapter 760 communicates with other modules of the electronic device 700 through the bus 730. It should be understood that although not shown in the figure, other hardware and/or software modules may be used in combination with the electronic device 700, including but not limited to: microcode, a device driver, a redundant processing unit, an external disk drive array, an RAID system, a tape driver, and a data backup storage system.

Through the foregoing description of the embodiments, persons skilled in the art may easily understand that the exemplary embodiments described herein may be implemented by software, or may be implemented by software in combination with necessary hardware. Therefore, the technical solutions according to the embodiments of the present disclosure may be implemented in a form of a software product. The software product may be stored in a non-volatile storage medium (which may be a compact disk read-only memory (CD-ROM), a USB flash drive, a removable hard disk, or the like), and includes a plurality of instructions to cause a computing device (which may be a personal computer, a server, a terminal apparatus, a network device, or the like) to perform the method according to the embodiments of the present disclosure.

An exemplary embodiment of the present disclosure further provides a computer-readable storage medium, where the computer-readable storage medium stores a program product that can be used to implement the method in the specification. In some possible embodiments, various aspects of the present disclosure may also be realized in a form of a program product, which includes program code. When the program product runs on a terminal device, the program code is used to enable the terminal device to perform the steps according to various exemplary embodiments of the present disclosure described in the foregoing "exemplary methods" of the specification.

Figure 8:
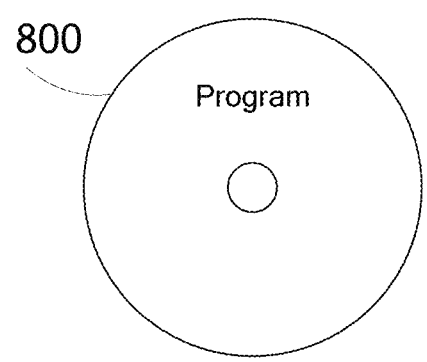
FIG. 8 is a schematic diagram of a computer-readable storage medium according to an exemplary embodiment of the present disclosure.

As shown in FIG. 8, a program product 800 for implementing the above method according to an embodiment of the present disclosure is depicted, which may employ a portable CD-ROM and include program code, and may run on a terminal device, such as a personal computer. However, the program product of the present disclosure is not limited hereto. In the present disclosure, the computer-readable storage medium may be any tangible medium that contains or stores a program, and the program may be used by or in combination with an instruction execution system, apparatus, or device.

The program product may be any combination of one or more readable media. The readable medium may be a readable signal medium or a readable storage medium. The readable storage medium may be, for example, but not limited to, electrical, magnetic, optical, electromagnetic, infrared, or semiconductor systems, apparatuses, or devices, or any combination thereof. More specific examples (non-exhaustive) of the readable storage medium may include, but are not limited to: an electrical connection with one or more conducting wires, a portable computer disk, a hard disk, an RAM, an ROM, an erasable programmable ROM (an EPROM or a flash memory), an optical fiber, a portable compact disk read-only memory (CD-ROM), an optical storage device, a magnetic storage device, or any suitable combination thereof.

The computer-readable signal medium may include a data signal propagated in a baseband or as a part of a carrier, and readable program code is carried therein. The propagated data signal may be in various forms, including but not limited to an electromagnetic signal, an optical signal, or any suitable combination thereof. The readable signal medium may alternatively be any readable medium other than the readable storage medium. The readable medium may send, propagate, or transmit a program configured to be used by or in combination with an instruction execution system, apparatus, or device.

The program code contained on the readable medium may be transmitted using any suitable medium, including but not limited to: wireless, wire, optical fiber, RF, or any suitable combination thereof.

Program code for executing the operations in the present disclosure may be compiled by using one or more programming languages or any combination thereof. The programming languages include object oriented programming languages, such as Java and C++, and conventional procedural programming languages, such as C or similar programming languages. The program code can be executed fully on a user computer, executed partially on a user device, executed as an independent software package, executed partially on a user computer and partially on a remote computer, or executed fully on a remote computer or a server. In a circumstance in which a remote computer is involved, the remote computer may be connected to a user computer via any type of network, including a LAN or a WAN, or may be connected to an external computer (for example, connected via the Internet by using an Internet service provider).

In addition, the foregoing drawings are merely schematic illustrations of the processes included in the method according to the exemplary embodiments of the present disclosure, and are not intended for limitation. It is easily understood that the processes shown in the foregoing drawings does not indicate or impose a limit on the chronological sequence of these processes. In addition, it is also easily understood that these processes can be performed synchronously or asynchronously, for example, in a plurality of modules.

Those skilled in the art can readily figure out other embodiments of the present disclosure after considering the specification and practicing the content disclosed herein. The present disclosure is intended to cover any variations, purposes or adaptive changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and spirit of the present disclosure are pointed out by the claims.

It should be noted that, the present disclosure is not limited to the precise structures described above and shown in the drawings, and can be modified and changed in many ways without departing from the scope of the present disclosure. The scope of the present disclosure is defined by the appended claims.

The invention claimed is:

1. A memory allocation method, comprising:
   obtaining a plurality of memory segments corresponding to a to-be-processed task, and determining a plurality of operation cores in an operation platform that executes the to-be-processed task;
   determining a plurality of first-capacity memory segments and a second-capacity memory segment in the plurality of memory segments according to a memory division reference value, wherein a memory capacity of the second-capacity memory segment is greater than a memory capacity of each of the plurality of first-capacity memory segments and greater than or equal to the memory division reference value, and the memory capacity of each of the plurality of first-capacity memory segments is less than the memory division reference value, and the memory division reference value equals a total memory capacity corresponding to the plurality of memory segments divided by an operation core quantity of the plurality of operation cores;
   allocating the plurality of first-capacity memory segments one by one to the plurality of operation cores, and determining remaining memory capacities corresponding to the plurality of operation cores respectively; and
   allocating the second-capacity memory segment to the plurality of operation cores according to the remaining memory capacities, to obtain a memory allocation result;
   wherein the allocating the plurality of first-capacity memory segments one by one to the plurality of operation cores comprises:
      using a preset arrangement order of the plurality of first-capacity memory segments as a memory segment arrangement order of the plurality of first-capacity memory segments; and
      obtaining an operation core arrangement order of the plurality of operation cores, and allocating the plurality of first-capacity memory segments one by one to the plurality of operation cores according to the memory segment arrangement order and the operation core arrangement order.

2. The method of claim 1, wherein before the obtaining a plurality of memory segments corresponding to a to-be-processed task, the method further comprises:
   obtaining the to-be-processed task, and determining a task operating requirement of the to-be-processed task;

determining a specified operating environment corresponding to the to-be-processed task according to the task operating requirement; and
determining the plurality of memory segments corresponding to the to-be-processed task in the specified operating environment.

3. The method of claim 2, wherein the determining the plurality of memory segments corresponding to the to-be-processed task in the specified operating environment comprises:
obtaining a memory configuration file corresponding to the specified operating environment, and determining a corresponding memory type according to the memory configuration file, wherein the memory type has corresponding segmental memories; and
configuring respective memory capacities corresponding to the segmental memories, to generate the plurality of memory segments corresponding to the segmental memories respectively.

4. The method of claim 3, wherein the obtaining a memory configuration file corresponding to the specified operating environment comprises:
entering the specified operating environment according to the task operating requirement in response to a boot-up instruction of the operation platform; and
obtaining a system operation file in the specified operating environment, and obtaining the memory configuration file from the system operation file.

5. The method of claim 1, wherein the allocating the plurality of first-capacity memory segments one by one to the plurality of operation cores according to the memory segment arrangement order and the operation core arrangement order comprises:
determining a memory segment identification (ID) corresponding to each of the plurality of first-capacity memory segments according to the memory segment arrangement order;
determining an operation core ID corresponding to each of the plurality of operation cores according to the operation core arrangement order;
obtaining the operation core quantity, and determining a memory allocation ID according to the operation core quantity and the memory segment ID; and
allocating each of the plurality of first-capacity memory segments to corresponding operation cores of the plurality of operation cores according to the memory allocation ID and the operation core ID.

6. The method of claim 1, wherein the determining remaining memory capacities corresponding to the plurality of operation cores respectively comprises:
determining an allocated first-capacity memory segment in each of the plurality of operation cores, and determining an occupied memory capacity of each of the plurality of operation cores according to the allocated first-capacity memory segment; and
obtaining the memory division reference value, and determining the remaining memory capacities according to the memory division reference value and the occupied memory capacity of each of the plurality of operation cores.

7. The method of claim 1, wherein the allocating the second-capacity memory segment to the plurality of operation cores according to the remaining memory capacities comprises:
performing a remaining memory allocation step for the plurality of operation cores one by one according to the remaining memory capacities and the operation core arrangement order, so as to allocate the second-capacity memory segment to the plurality of operation cores.

8. The method of claim 7, wherein the remaining memory allocation step comprises:
obtaining a current operation core and a current-core remaining memory capacity corresponding to the current operation core;
determining, from the second-capacity memory segment, a remaining memory segment corresponding to the current operation core, wherein the remaining memory segment is a partial memory segment, which is the same as the current-core remaining memory capacity, in the second-capacity memory segment; and
allocating the remaining memory segment to the current operation core.

9. The method of claim 8, wherein the allocating the remaining memory segment to the current operation core comprises:
obtaining an occupied memory capacity and a memory start address of the current operation core;
determining a memory intermediate address corresponding to the current operation core according to the memory start address and the occupied memory capacity; and
determining a start address corresponding to the remaining memory segment according to the memory intermediate address.

10. The method of claim 2, further comprising:
executing the to-be-processed task in the specified operating environment according to the memory allocation result.

11. A memory allocation apparatus, comprising:
a processor; and
a storage apparatus, configured to store a computer program, wherein the computer program, when executed by the processor, causes the processor to execute operations of:
obtaining a plurality of memory segments corresponding to a to-be-processed task, and determining a plurality of operation cores in an operation platform that executes the to-be-processed task;
determining a plurality of first-capacity memory segments and a second-capacity memory segment in the plurality of memory segments according to a memory division reference value, wherein a memory capacity of the second-capacity memory segment is greater than a memory capacity of each of the plurality of first-capacity memory segments and greater than or equal to the memory division reference value, and the memory capacity of each of the plurality of first-capacity memory segments is less than the memory division reference value, and the memory division reference value equals a total memory capacity corresponding to the plurality of memory segments divided by an operation core quantity of the plurality of operation cores;
allocating the plurality of first-capacity memory segments one by one to the plurality of operation cores, and determining remaining memory capacities corresponding to the plurality of operation cores respectively; and
allocating the second-capacity memory segment to the plurality of operation cores according to the remaining memory capacities, to obtain a memory allocation result;

wherein the allocating the plurality of first-capacity memory segments one by one to the plurality of operation cores comprises:
  using a preset arrangement order of the plurality of first-capacity memory segments as a memory segment arrangement order of the plurality of first-capacity memory segments; and
  obtaining an operation core arrangement order of the plurality of operation cores, and allocating the plurality of first-capacity memory segments one by one to the plurality of operation cores according to the memory segment arrangement order and the operation core arrangement order.

12. A non-transitory computer-readable storage medium, storing a computer program, wherein the computer program, when executed by a processor, causes the processor to execute operations of:
  obtaining a plurality of memory segments corresponding to a to-be-processed task, and determining a plurality of operation cores in an operation platform that executes the to-be-processed task;
  determining a plurality of first-capacity memory segments and a second-capacity memory segment in the plurality of memory segments according to a memory division reference value, wherein a memory capacity of the second-capacity memory segment is greater than a memory capacity of each of the plurality of first-capacity memory segments and greater than or equal to the memory division reference value, and the memory capacity of each of the plurality of first-capacity memory segments is less than the memory division reference value, and the memory division reference value equals a total memory capacity corresponding to the plurality of memory segments divided by an operation core quantity of the plurality of operation cores;
  allocating the plurality of first-capacity memory segments one by one to the plurality of operation cores, and determining remaining memory capacities corresponding to the plurality of operation cores respectively; and
  allocating the second-capacity memory segment to the plurality of operation cores according to the remaining memory capacities, to obtain a memory allocation result;
  wherein the allocating the plurality of first-capacity memory segments one by one to the plurality of operation cores comprises:
    using a preset arrangement order of the plurality of first-capacity memory segments as a memory segment arrangement order of the plurality of first-capacity memory segments; and
    obtaining an operation core arrangement order of the plurality of operation cores, and allocating the plurality of first-capacity memory segments one by one to the plurality of operation cores according to the memory segment arrangement order and the operation core arrangement order.

* * * * *